(12) United States Patent
She et al.

(10) Patent No.: US 9,771,103 B2
(45) Date of Patent: Sep. 26, 2017

(54) ACTIVE DISTURBANCE REJECTION FOR ELECTRICAL POWER STEERING SYSTEM

(71) Applicant: TRW Automotive U.S. LLC, Livonia, MI (US)

(72) Inventors: Yun She, Clawson, MI (US); Arnold H. Spieker, Commerce Township, MI (US); Chris Mantjios, Rochester, MI (US); Keiwan Kashi, Dusseldorf (DE)

(73) Assignee: TRW Automotive U.S. LLC, Livonia, MI (US)

( * ) Notice: Subject to any disclaimer, the term of this patent is extended or adjusted under 35 U.S.C. 154(b) by 0 days.

(21) Appl. No.: 15/111,671

(22) PCT Filed: Jan. 14, 2015

(86) PCT No.: PCT/US2015/011469
§ 371 (c)(1),
(2) Date: Jul. 14, 2016

(87) PCT Pub. No.: WO2015/109025
PCT Pub. Date: Jul. 23, 2015

(65) Prior Publication Data
US 2016/0325780 A1 Nov. 10, 2016

Related U.S. Application Data

(60) Provisional application No. 61/927,197, filed on Jan. 14, 2014.

(51) Int. Cl.
*B62D 5/04* (2006.01)
*B62D 6/08* (2006.01)

(52) U.S. Cl.
CPC ............. *B62D 6/08* (2013.01); *B62D 5/0457* (2013.01); *B62D 5/0472* (2013.01)

(58) Field of Classification Search
CPC ...... B62D 6/08; B62D 5/0457; B62D 5/0472; B62D 5/046
See application file for complete search history.

(56) References Cited

U.S. PATENT DOCUMENTS

2009/0200099 A1* 8/2009 Wong .................. B62D 5/0463
180/446
2010/0324784 A1* 12/2010 Yu ....................... B62D 5/0472
701/42

(Continued)

FOREIGN PATENT DOCUMENTS

JP        2003-81122     *   3/2003
WO    WO2013-151714   *   10/2013

OTHER PUBLICATIONS

Mehrabi et al.; Optimal disturbance rejection control design for electric power steering systems; 2011 50th IEEE Conf. on Decision and Control and European Control Conf.; IEEE; Dec. 12-15, 2011; pp. 6584-6589.*

(Continued)

*Primary Examiner* — Michael J Zanelli
(74) *Attorney, Agent, or Firm* — MacMillan, Sobanski & Todd, LLC (57) ABSTRACT

A method of controlling disturbances associated with electric power steering (EPS) systems maintains an original assist torque to feedback signal in the EPS, such as a column torque, and further minimizes the impact from the disturbance source to the feedback signal so that the disturbance is rejected while the original steering feel is maintained. The method further considers interaction of the rejection feature with other functions of the EPS. In one embodiment, relationships for isolating the disturbance are achieved by utilizing a combined feedback and feed-forward compensator.

11 Claims, 12 Drawing Sheets

(56) References Cited

U.S. PATENT DOCUMENTS

2012/0004807 A1* 1/2012 Hales .................. B62D 5/0472
701/41
2013/0131926 A1* 5/2013 Champagne ......... B62D 5/0472
701/42

OTHER PUBLICATIONS

Dong et al.; On a robust control system design for an electric power assist steering system; 2010 American Control Conf.; IEEE; Jun. 30-Jul. 2, 2010; pp. 5356-5361.*

* cited by examiner

ACTIVE DISTURBANCE REJECTION FOR ELECTRICAL POWER STEERING SYSTEM

CROSS-REFERENCE TO RELATED APPLICATIONS

This application is the National Phase of International Application PCT/US2015/011469 filed Jan. 14, 2015 which designated the U.S. and that International Application was published in English under PCT Article 21(2) on Jul. 23, 2015 as International Publication Number WO 2015/109025. PCT/US2015/011469 claims priority to U.S. Provisional Application No. 61/927,197, filed Jan. 14, 2014. Thus, the subject nonprovisional application claims priority to U.S. Provisional Application No. 61/927,197, filed Jan. 14, 2014. The disclosures of both applications are incorporated herein by reference in their entirety.

BACKGROUND OF THE INVENTION

This invention relates in general to a generalized active disturbance rejection approach for electrical power steering (EPS) systems. In particular, this invention relates to an active disturbance rejection circuit and control algorithm having a minimal effect on steering feel. This invention further reduces the dependency on accurate disturbance frequency information in operation to maintain consistent steering feel and compensate the dynamics differences and potential interactions with other functions in EPS or other vehicle systems.

Methods exist to provide certain levels of active disturbance rejection through either disturbance feed-forward cancellation or attenuation of system gain within an interested frequency range via certain resonant filters. In general, a disturbance feed-forward system detects the disturbance and provides this disturbance information to an actuator to counteract the deleterious effects of the detected disturbance. This typically involves two steps, namely, disturbance detection and command generation. However, disturbance detection typically relies on a certain amount of transient time in order to accurately detect the disturbance. This approach might not be applicable in some scenarios, such as brake pulsations, where the disturbance frequency is proportional to the wheel speed and changes during the braking process due to the change in wheel speed. In addition, the disturbance detection process is typically realized via different types of filters.

In EPS applications, the resonant filter will also filter out the same frequency component that exists in the original motor torque. This filtering will affect the steering feel and require a tedious, iterative calibration process to balance steering feel and active disturbance rejection capability. Due to this condition, the disturbance detected not only includes the original disturbance but also includes the signals from original motor torque. Because of the inclusion of overlapping frequencies from different sources, this disturbance rejection method affects steering feel because the system will also cancel the frequency component of the original motor torque. While the disturbance rejection capability can be increased via high gain for either proportional method and/or integral method, this, in turn, will make the system more unstable and sensitive to parameter uncertainties. Also, the implementation of these prior art methods requires significant computational resources and memory due to their use and implementation of trigonometry. There is also a tendency to introduce complexity in analyzing a system's performance in terms of stability and effectiveness because the system is inherently nonlinear. This complexity is further compounded due to the level of accuracy needed in identifying the disturbance frequency in order to detect the disturbance.

Attenuating system gain within a disturbance frequency range is another typical approach in existing literatures. The strategy here is to lower the system gain such that the disturbance energy is less perceivable at the steering wheel or other EPS component. This real-time strategy is intended to respond instantaneously to disturbances and, therefore, be applicable to scenarios such as brake pulsation compensation. However, this approach cannot achieve 100% disturbance rejection, even from theoretical point of view. Also, it will affect the steering feel and stability significantly and often requires re-tuning of the original system.

Figure 1A:
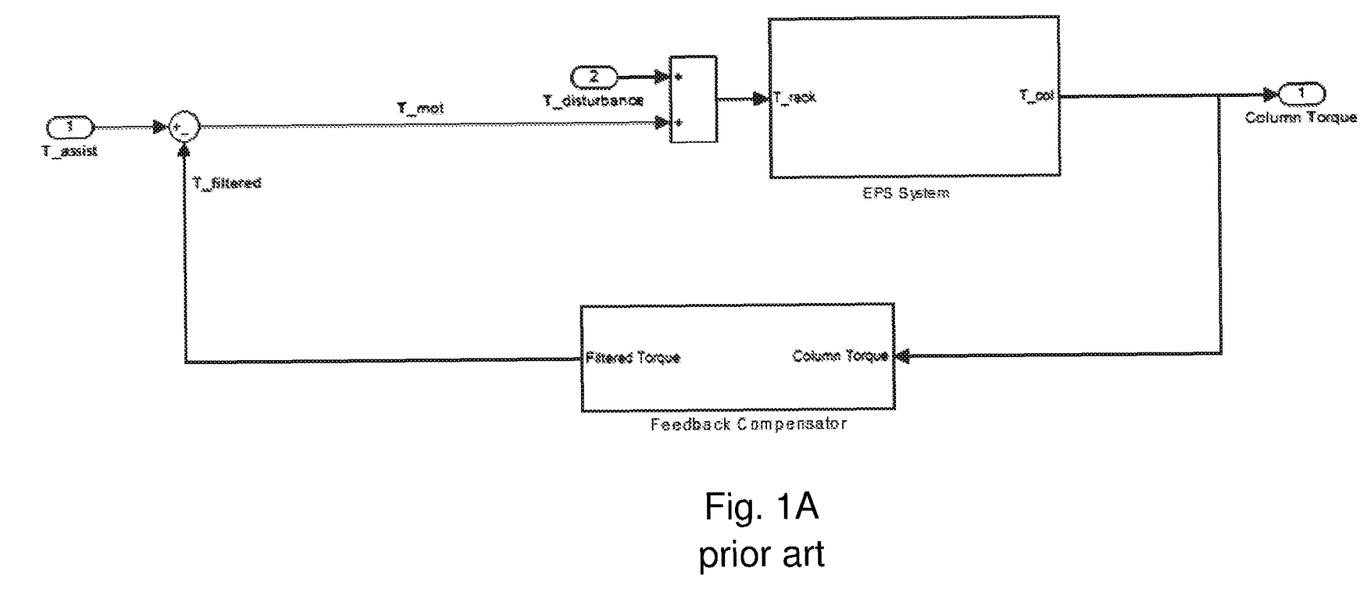
FIG. 1A is a schematic illustration of a prior art disturbance cancellation system.

Other methods attempt to utilize the concept of a standard feed-forward approach (in reference to control input, meaning that disturbance is added into control channel instead of being fed back to construct tracking error as feedback control) to cancel disturbances, as shown in FIG. 1A. $T_{assist}$ is the total assist in rack coordinate without active disturbance rejection capability. $T_{filtered}$ is the active disturbance rejection torque in rack coordinate. $T_{mot}$ is the final assist torque in rack coordinate. This idea is fairly standard and well-known within controls community. However, because an external disturbance, $T_{disturbance}$, is not measurable at its generation source and is measured indirectly at the output, which is to be controlled/affected by control input, this standard feed-forward approach is essentially a feedback configuration. These approaches typically fail to achieve 100% disturbance reduction due to an inherent feedback mechanism in the loop: column torque-motor torque-column torque. Since the disturbance is indirectly measured via the column torque sensor, disturbance rejection algorithms are feedback mechanisms which inherently will not provide 100% disturbance rejection. A high-gain compensation approach may be utilized to reduce such effects but tends to make the system overly sensitive to parameter uncertainties and high frequency noises from column torque sensor which generates instability issues. Furthermore, this approach will have impact on steering feel due to the fact that the feedback compensator, as shown in FIG. 1A. The feedback compensator is typically represented as resonant filter or a modulation-demodulation process. These devices will filter out not only the disturbance but also the related signal in $T_{assist}$ that contains a similar frequency to that of the disturbance. This affects steering feel and requires an iterative tuning process to achieve the improved steering feel while rejecting the disturbance.

Figure 1B:
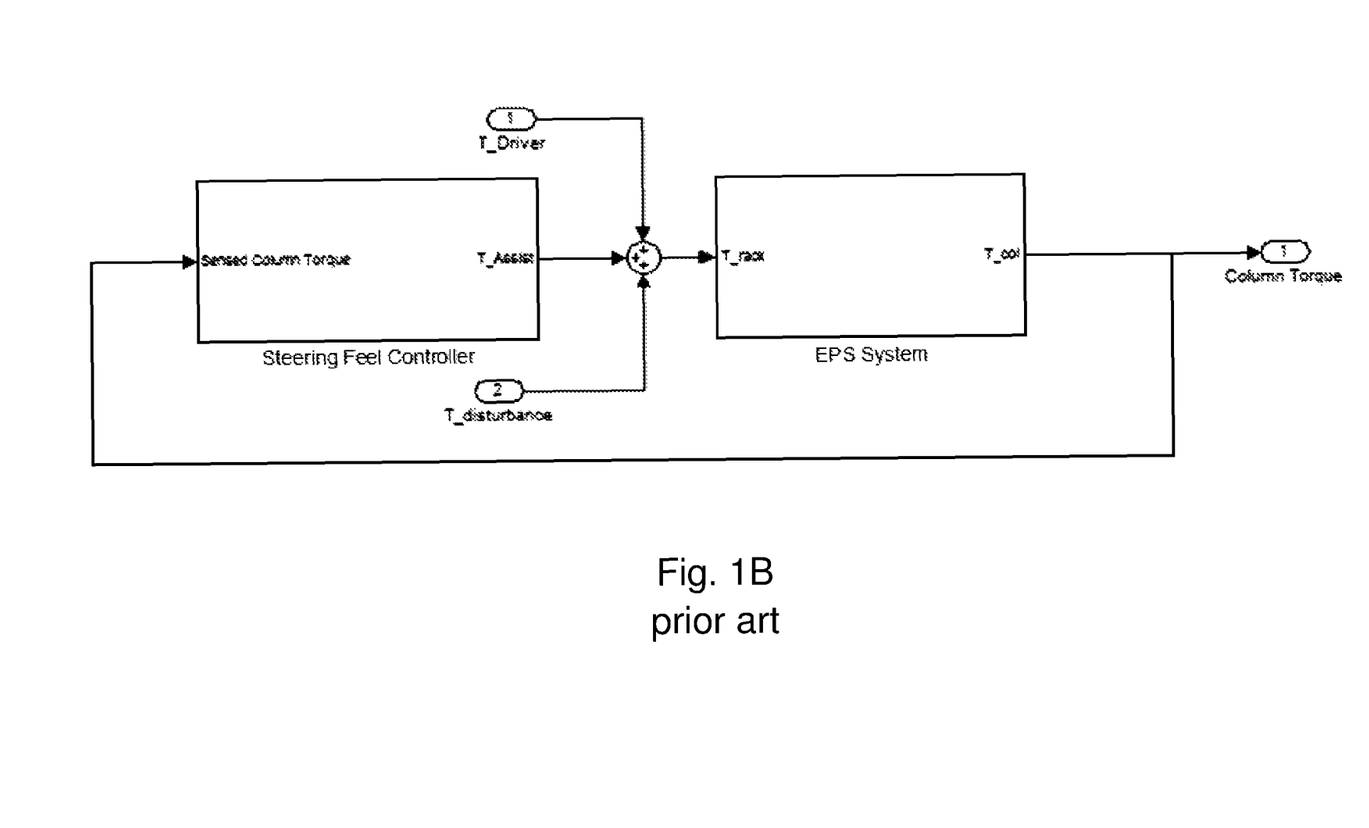
FIG. 1B is a schematic illustration of another prior art disturbance cancellation system.

FIG. 1B is a representation of a standard EPS system where the variables $T_{Driver}$, $T_{assist}$ and $T_{disturbance}$ are defined as driver torque, assistance torque and disturbance force (in an appropriate coordinate system) applied to the rack. Other coordinates can also be chosen when necessary. In prior art EPS systems, disturbance forces are typically not measured and are considered difficult to measure directly. These forces, however, are indirectly observable from other available EPS inputs, such as column torque, column velocity, motor velocity, etc. In the above example, the disturbance is defined as a rack force disturbance and the measurement state is defined to be column torque.

There are, in particular, two known prior art systems, disclosed in US Patent Publication No. 2012/0061169 to General Motors and U.S. Pat. No. 8,219,283 to Ford Motor Co., which illustrate aspects of the prior art described above. The disclosures of these references are incorporated by reference.

SUMMARY OF THE INVENTION

This invention relates to a system and method for providing a general active disturbance rejection (ADR) approach for an EPS system having a minimal/no effect on steering feel. In particular, this invention relates to an EPS active disturbance rejection (ADR) system that can serve as a plug-in module to an existing vehicle platform, especially one having calibrated EPS control functions.

The flexibility of the inventive control structure allows the EPS system to be modified to arbitrarily reject any undesired disturbance. One example of such a disturbance rejection would be a periodic disturbance rejection to reduce steering wheel shake or nibble. Such a disturbance may be due, for example, to either mass imbalances of the wheels or pulsations from brake disc systems, such as those caused by runout or thickness variations due to warping or bearing/caliper alignment. In one embodiment, the EPS disturbance rejection system and method are responsive to disturbances that are not predominantly periodic or are totally random in excitation character.

The method, and the supporting apparatus/system, provide active disturbance rejection for selective frequency ranges of either a single frequency or any band of a desired frequency range. In one embodiment of the method, a disturbance frequency range is used for active disturbance rejection. In this embodiment, no wheel frequency information is required. In other embodiments, wheel frequency data, among other data inputs, may be utilized. The disturbance frequency range is a property of the vehicle platform and typically determined during vehicle design and development. The method and system is configured to have a minimal impact of steering feel and existing controller with calibrated parameters. The method and system further enable minimal/meaningful parameters for tuning. In addition, there is an upper limit of a 100% disturbance reduction capability. In a plug-in module embodiment, the method and system have minimal impact on the original system's stability. The invention further provides a simple implementation strategy requiring minimal computer memory. In addition, the method and system are effective to reject the effect of column torque noise or other oscillatory disturbances, i.e., motor ripple, on the overall system performance.

The method and supporting apparatus/system further supports system dynamic changes which consider driver interactions with system, i.e. hands-off scenarios, diagnostics capability for erroneous compensation, and interactions with other modules.

The method of ADR may be a combination of one or more of the following enumerated characterizations:

1. An active disturbance rejection method for maintaining original assist torque to feedback signals in an EPS, such as column torque, that further minimizes the impact from a disturbance source to the feedback signal so that the disturbance is rejected while the original steering feel is maintained and proper interaction of the method with other functions of EPS in considered.
2. A disturbance isolation approach to meet following principles:

$$\frac{T_{col}(s)}{T_{assist}(s)} \approx p(s) \text{ and } \frac{T_{col}(s)}{T_{disturbance}(s)} \approx 0$$

Where p(s) is the nominal system model from assistance torque to measurable state (column torque in this example) within interested frequency range, the first equation stating that the steering system dynamics from original assist torque to column torque is maintained to maintain the original steering feel, and the second equation states that the disturbance input does not have an impact on column torque, which isolates the disturbance from the driver, thus rejecting the disturbance.

3. The ADR method described in characterization 1, including a combined feedback and feed-forward compensator.
4. The ADR method described in characterization 2, including feedback and feed-forward calculations, based at least in part on the equations of:

$$C_{feedback}(s) = H(s)P_n^{-1}(s)$$

$$C_{feedforward}(s) = \frac{1}{1 - H(s)}$$

where H(s) is a filter, $P_n(s)$ is a model approximation.
5. The ADR method described in characterization 4, where a choice of filter H(s) is made, that choice based upon characteristics of disturbance frequency, noise requirement in the system, and the like, wherein the filter may be one or more of the following:
   (1) Low-pass filter, (2) High-pass filter, (3) Band-pass filter, (4) Selective filter, Or (5) combination of one or more of filters (1)-(4) by either repeating the structure or designing multiple H(s) to span the specific disturbance frequency ranges
6. The ADR method described in characterizations 4 or 5, where the design of filter H(s) can be performed either off-line or on-line by adjusting parameters of the filter to meet certain criteria in order to achieve optimal system performance.
7. The ADR method described in characterizations 4, 5, or 6, where parameters of filter H(s) can be further selected by one or more vehicle states, either alone or in any combination, of a Vehicle speed, a Wheel speed, a Column Velocity and a Column Angle.
8. The ADR method described in characterizations 4, 5, 6, or 7, where the design of $P_n(s)$ can be designed either off-line or on-line by adjusting parameters of it such that optimal system performance is achieved.
9. The ADR method described in characterizations 4 through 8, where selection of parameters of $P_n(s)$ can be further selected by one or more vehicle states or combination of them such as the Vehicle speed, the Wheel speed, the Column Velocity, the Column Angle and Driver Interactions and Vehicle Conditions.
10. The ADR method described in characterization 1, where an ADR Torque is a result of a comparison of the original assist torque to column torque and the ADR system is enable or disabled by the use of hysteresis or a similar function, such as ramping, determined by vehicle states (such as a vehicle speed), or quality of sensor value (such as a torque sensor, speed sensor, etc.).
11. The ADR method described in characterization 10 where the ADR system is enabled or disabled by a diagnostic algorithm to verify the method effectiveness to avoid erroneous compensation.
12. The ADR method described in characterizations 10 or 11, where when the ADR system is disabled, one or more compensation strategies can be applied, such as (1) Switch to second disturbance compensation strategy that might still work under current vehicle conditions, (2) Hold the last control action before active disturbance rejection is totally disabled, or (3) totally disable any active disturbance rejection torque.

13. The ADR method described in characterizations 10, 11, or 12, where a other forms of disturbances may be rejected utilizing alternative filter configurations, such as noise suppression via designing of filter H(s) to be a band pass filter such that an objectionable noise frequency is removed.

14. The ADR method described in characterization 4 where the structure and methodology of the EPS ADR System is configured to utilize original torque $T_{assist}$ information and pass this into filter H(s) to assist in recovering steering feel.

Various aspects of this invention will become apparent to those skilled in the art from the following detailed description of the preferred embodiment, when read in light of the accompanying drawings.

DETAILED DESCRIPTION OF THE PREFERRED EMBODIMENT

Figure 2:
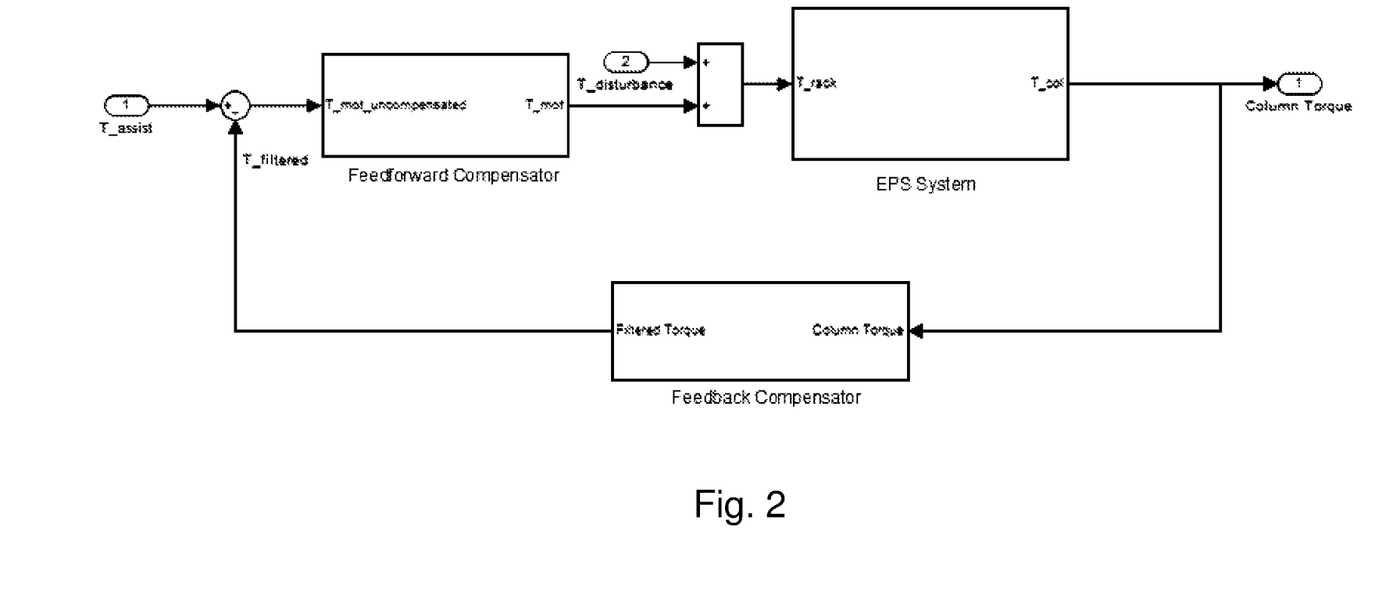
FIG. 2 is a schematic illustration of a disturbance cancellation system in accordance with the invention.

Referring now to FIG. 2, there is illustrated an EPS disturbance rejection system having an alternative control structure and associated systematic design approach to reject $T_{disturbance}$ through a combined feedback compensator and feed-forward compensator design. The EPS system is configured to isolate a disturbance such that it does not affect the column torque, $T_{col}$, rather than merely detecting the disturbance and then generating a compensating torque. The EPS system is configured as a control system that provides disturbance isolation by using a feed-forward compensator block. The feed-forward compensator provides an additional degree of freedom which allows the various transfer functions inputted to the column torque to be shaped or otherwise altered, for example, by modulation or attenuation. A feedback compensator allows the disturbance observed in the column torque to provide suitable feedback information. The feed-forward compensator is configured to shape the control loop such that there is a high sensitivity between the original assistance torque and the column torque and very low sensitivity between the disturbance force and the column torque.

In one embodiment, the structure of the feedback and feed-forward compensator is configured to meet following criteria:

$$\frac{T_{col}(s)}{T_{assist}(s)} \approx p(s) \text{ and} \quad (1)$$

$$\frac{T_{col}(s)}{T_{disturbance}(s)} \approx 0 \quad (2)$$

In one aspect of this embodiment, there is provided:

$$C_{feedback}(s) = H(s)P_n^{-1}(s) \text{ and} \quad (3)$$

$$C_{feedforward}(s) = \frac{1}{1 - H(s)} \quad (4)$$

By utilizing this aspect, the transfer function from $T_{assist}$ to $T_{col}$ may be described as:

$$\frac{T_{col}(s)}{T_{assist}(s)} = \frac{p(s)p_n(s)}{H(s)[p(s) - p_n(s)] + p_n(s)} \quad (5)$$

The transfer function from $T_{disturbance}$ to $T_{col}$ is:

$$\frac{T_{col}(s)}{T_{disturbance}(s)} = \frac{p_n(s)p(s)[1 - H(s)]}{H(s)[p(s) - p_n(s)] + p_n(s)} \quad (6)$$

Regarding equation (1) above, p(s) is the nominal system model from assistance torque to measurable state (column torque in this example) within an interested frequency range. Equation (1) states that the steering system dynamics from original assist torque to column torque is maintained. This maintains the original steering feel. Equation (2) states that the disturbance input does not have impact on column torque, this isolates the disturbance from the driver. With respect to equations (3) and (4), H(s) is a filter that allows the interested disturbance forcing function to pass through. This means that H(s)≈1 for certain frequency ranges that also contain frequency ranges of the disturbance. The type of filter characterized by H(s) can be very flexible depending on characteristics of disturbance to be rejected. Non-limiting examples of such filters include, but are not limited to, (1) Low-pass filters; (2) High-pass filters; (3) Band-pass filters; (4) Selective filters, or combinations of one or more of these filters. The filter combinations may be formed by either repeating the structure or designing multiple H(s) filters to span the specific disturbance frequency ranges. In one embodiment, the input parameters may be one or more vehicle states or combinations thereof, such as for example (1) Vehicle speed; (2) Wheel speed; (3) Column velocity; and (4) Column Angle. Referring to equations (5) and (6), $p_n(s)$ is a model approximation designed such that $p(s) \approx p_n(s)$ within interested frequency range. Design of $p_n(s)$ can be realized by many techniques such as cascading the original plant with a lead-lag compensator to have unit gain and zero phase within interested frequency range. Alternatively, $p_n(s)$ can be simply obtained via an optimization method to match a proper, stable $p_n(s)$ to $p(s)$ within the interested frequency range.

Figure 3:
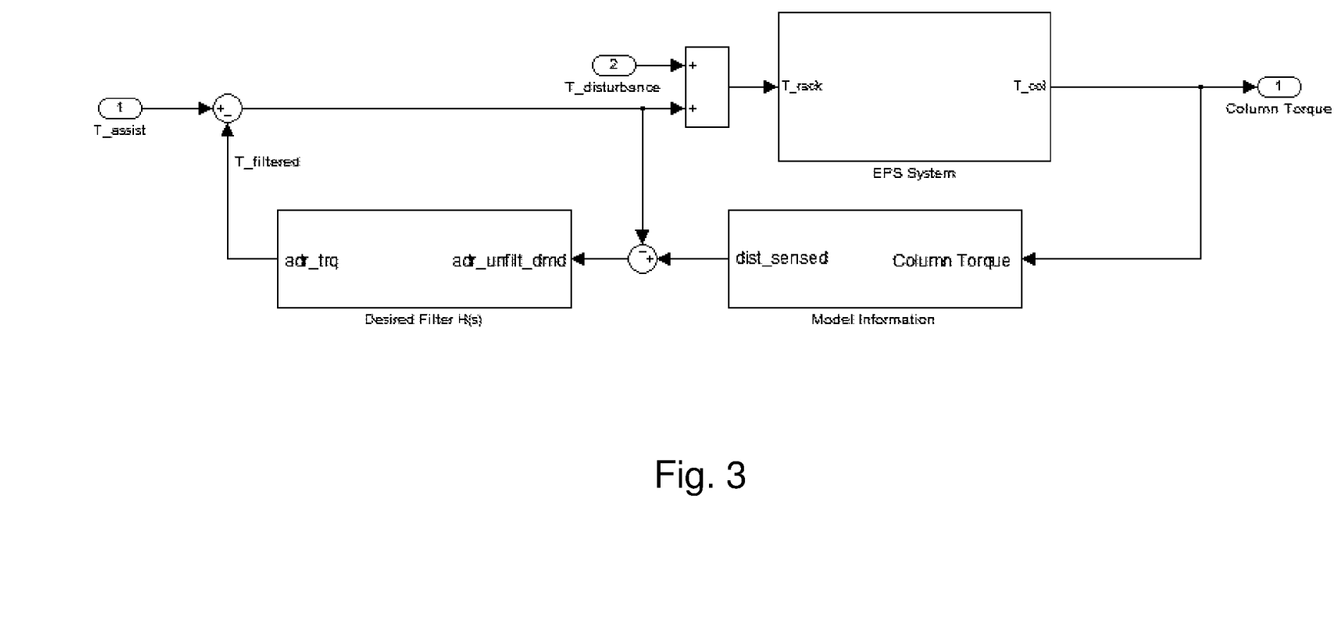
FIG. 3 is a schematic illustration of an alternative embodiment of a disturbance cancellation system in accordance with the invention.

Alternatively, the developed filter H(s) can be shared for both feedback and feed-forward loop configurations leading to a more simplified control architecture, shown in FIG. 3. Column torque information is sensed and computed using the model information block to obtain road disturbance information. The output of this computation is subtracted (or added depending on system polarity) from the total assist torque demand, which is a combination of original assist torque $T_{assist}$ and the filtered disturbance information from H(s). By doing this subtraction (or addition depending on system polarity) and passing original $T_{assist}$ information to filter H(s), effectively, steering feel issues are compensated for, due to the fact that filter H(s) will also filter out the frequency component in original assist torque $T_{assist}$. This architecture may also be used with other existing methodologies where a developed ADR algorithm will affect steering feel.

Figure 7:
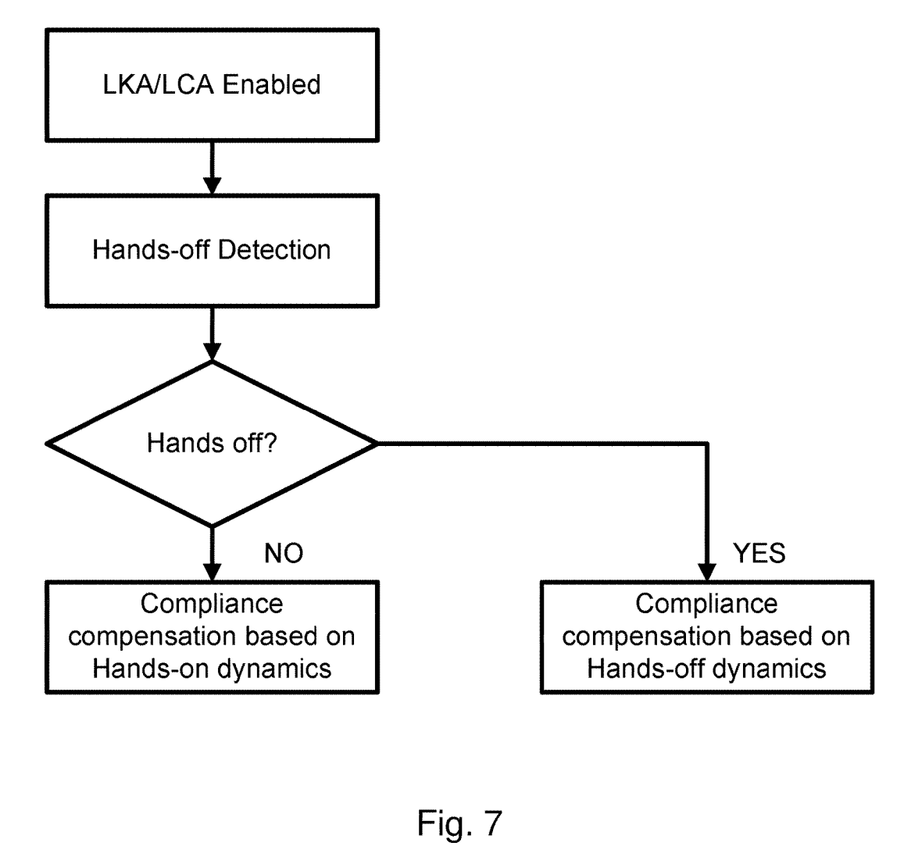
FIG. 7 is a flow chart showing an embodiment of an EPS disturbance rejection system having an operational mode algorithm.
Figure 8:
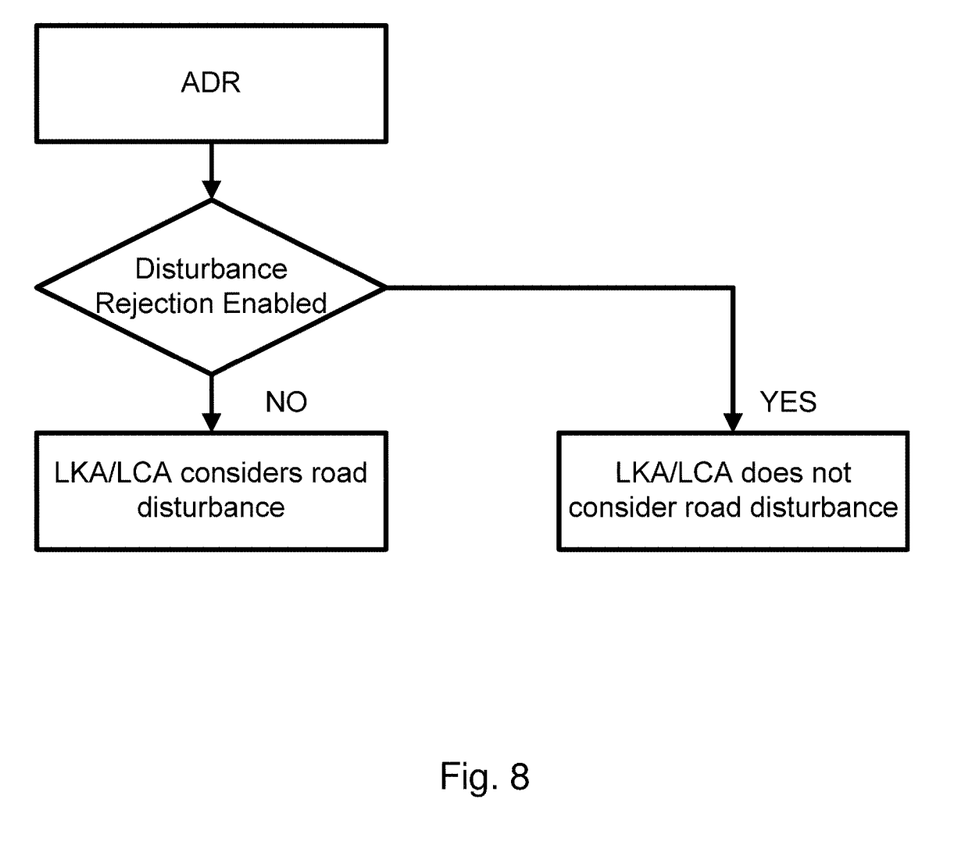
FIG. 8 is a flow chart of an embodiment of an EPS having an active disturbance rejection system as an input to a lateral support module.

Furthermore, implementation of $p_n(s)$ can also depend on various vehicle conditions or driver interactions. For example, dynamics of the EPS might change depending on a particular operating mode, such as hands-on or hands-off. Ideally, compliance compensation takes such scenarios into considerations. Features that have hands-off detection capability can provide input to ADR module to indicate vehicle running conditions. For example, some embodiments of the EPS ADR system may include Lane Keeping Assist (LKA) and Lane Centering Assist (LCA) detection capabilities that provide additional assistive torque inputs to the EPS in response to particular sensor input scenarios. LKA provides a counter-steering torque to provide a driver assistive input that alerts a driver to adjust the vehicle trajectory to help guide a driver back to the center of a lane. LCA provides a torque input to the steering system in order to support maintaining the vehicle in the center of the lane. In addition to LKA/LCA, standard Hands-off detection modules may also provide operational input to the EPS. One embodiment of such a design is shown in FIG. 7, where hands on/off information may be provided by LKA/LCA module to indicate different compliance compensation required by the ADR system. Similarly, ADR may also provide necessary feedback to other features to indicate necessary consideration of such compensation as shown in FIG. 8.

Assuming that $p(s) \approx p_n(s)$ and $H(s) \approx 1$ are within the interested frequency range, then:

$$\frac{T_{col}(s)}{T_{assist}(s)} \approx p(s) \text{ and } \frac{T_{col}(s)}{T_{disturbance}(s)} \approx 0 \qquad (7)$$

This demonstrates that the proposed control structure can decouple a disturbance from the original assist torque such that the disturbance can be theoretically rejected 100% without modifying prior calibrations. Therefore, both disturbance rejection and minimal effect of steering feel are simultaneously achieved.

The advantages of the EPS ADR system and method are that the filter, H(s) and plant approximation $p_n(s)$ can be tailored to a desired frequency or frequency range depending upon the disturbance characteristics. In addition, multiple disturbances sources i.e. brake pulsation, wheel imbalance, motor ripple, etc can be rejected by either repeating the structure or designing the H(s) and $p_n(s)$ to span the disturbance frequency range. Finally, the system flexibility enables simplification of plant model approximation and filter design if desired for real-time implementation.

In an embodiment of a design method, the following steps may be used to develop the EPS ADR system. In a first step, a nominal transfer function for the EPS system is identified. Then, an interested frequency range, $\omega_{low} \leq \omega \leq \omega_{high}$ is determined based on different platforms and applications. In a brake pulsation compensation application, for example, co can be a function of wheel rotational frequency or position or velocity or combination of those. This may be calculated from, for example, wheel speed, vehicle speed, tone wheel pulses or received from a signal via CAN. Then, within the interested frequency range, a plant model $P_n(s)$, is designed such that $P_n^{-1}(s)P(s) \approx 1$. Design of $P_n(s)$ can be realized by many techniques such as, for example, cascading the original plant with a lead-lag compensator to have unit gain and zero phase within an interested frequency range. Alternatively, the plant model may be simply obtained via an optimization method to match a proper, stable $P_n(s)$ to $P(s)$ within the interested frequency range. It is also possible to compute $P_n(s)$ on-line via measurement of other EPS states such as column position, column torque, column velocity, motor position, etc. As such, the method will compensate model changes due to wear or changes of vehicle conditions. Then, a filter H(s) is designed that matches the properties of the disturbance to be rejected, i.e. a low-pass filter, high-pass filter or band-pass filter or a highly selective filter. The interested frequency may be a function of wheel speed, vehicle operation conditions, etc. Alternatively, the interested frequency range may be designed off-line based on analyses of frequency property or statistics property.

Figure 9:
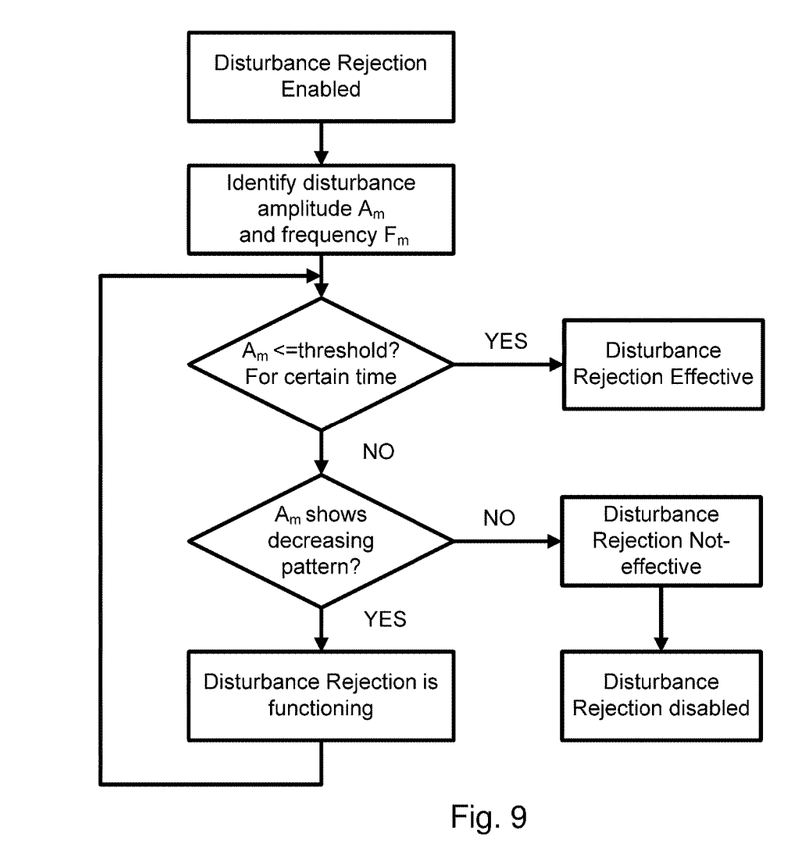
FIG. 9 is a flow chart of an EPS system algorithm configured to monitor the effectiveness of active disturbance rejection.

The features of the ADR system disclosed by the various embodiments described herein can be enabled or disabled as required to meet system needs. This can be achieved via a number of techniques, such as a hysteresis based approach or a ramping in/out. Furthermore, this feature can be monitored or diagnosed in order to avoid erroneous compensation by a number of techniques, i.e. comparing performance difference between with and without compensation. One embodiment of monitoring the effectiveness of active disturbance rejection is shown in FIG. 9. In this embodiment, the frequency of a target disturbance is monitored to ensure that disturbance rejection is effective. If disturbance rejection performance actually becomes worse, the ADR will be disabled. Criteria of effectiveness of the ADR system may be based, at least in part on, an observed increase in the disturbance pattern, such as by a cumulative sum control chart (CUSUM) or by generating an average value of disturbance torque via a moving average filter.

In one embodiment, the EPS disturbance rejection method is applied to reject a periodic disturbance in EPS system without knowledge of the magnitude and phase of the disturbance. In another embodiment, the value of the disturbance frequency may be an initial approximation, rather than a known value. As an initial approximation, the disturbance frequency may be unknown and established as an initial guess or starting point based on previous system experience or overall vehicular system configuration parameters, i.e., vehicular tolerance or specification limits. The effectiveness of this method is demonstrated under several Examples, as listed below.

EXAMPLE 1

The original torque assist, $T_{assist}$, has a frequency components from 5-20 Hz. The disturbance, $T_{disturbance}$, is a periodic signal with a frequency of about 12 Hz.

The interested disturbance frequency range is 10-20 Hz, which is the typical range for smooth road shake. This information is used to define properties of the filter and model.

Figure 4A:
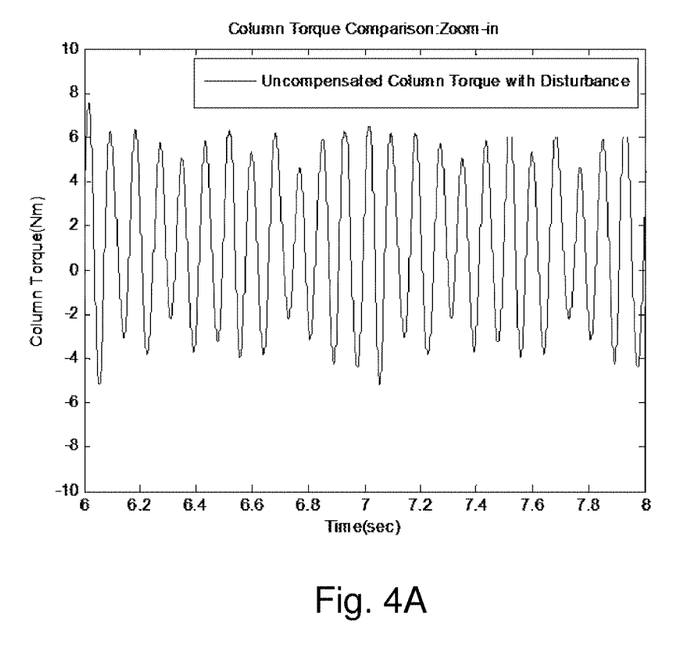
FIG. 4A is a graph of Column Torque, $T_{col}$ having a disturbance forcing function.
Figure 4B:
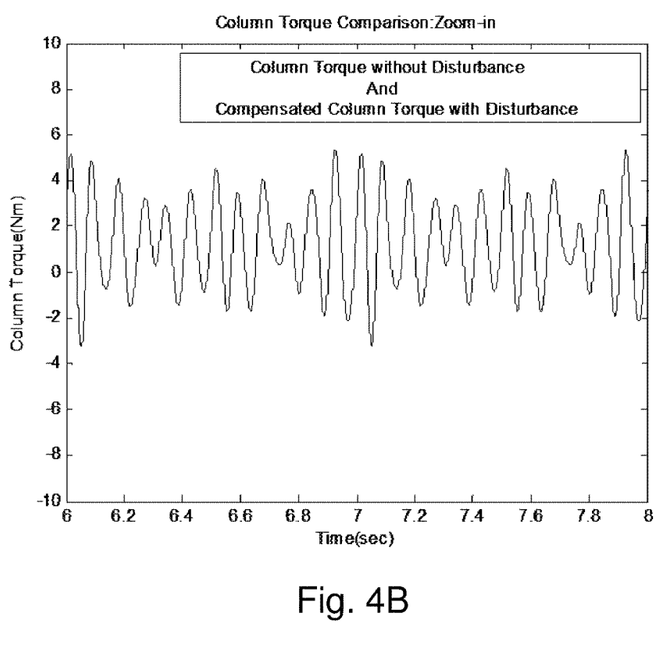
FIG. 4B is a graph of Column Torque, $T_{col}$ of FIG. 4A after correction by active disturbance rejection.
Figure 4C:
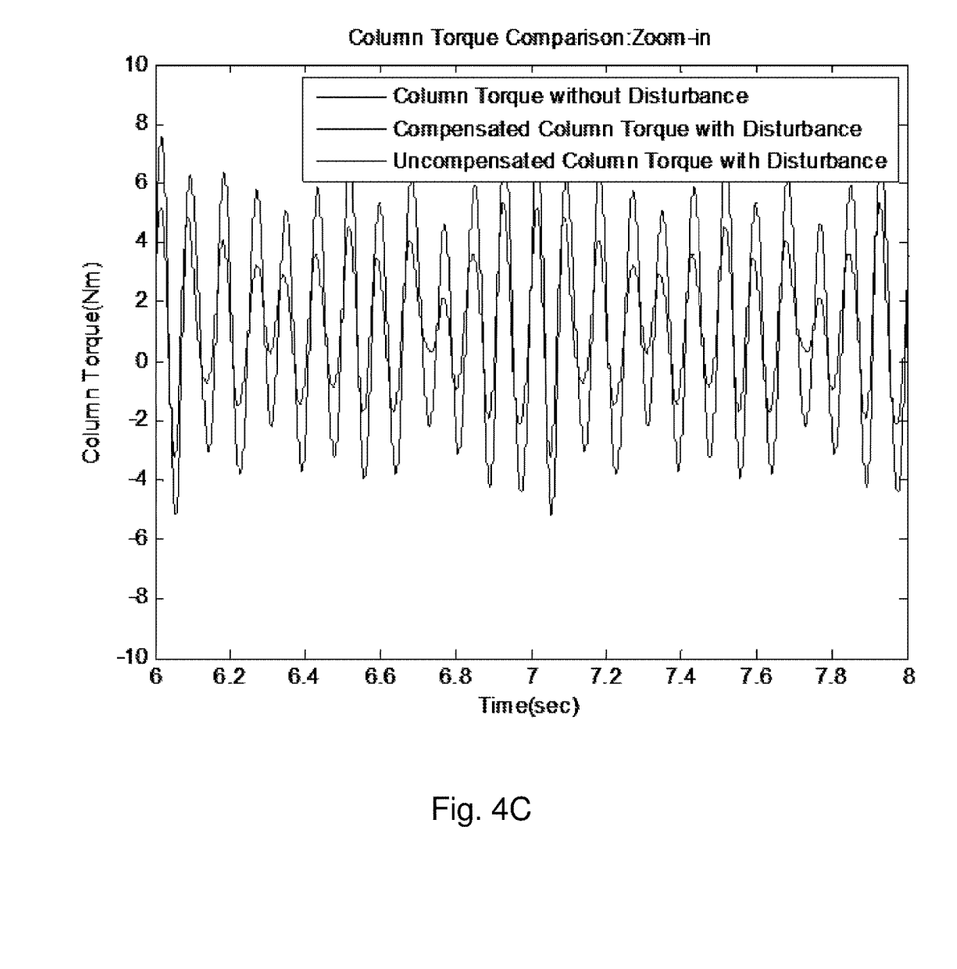
FIG. 4C is an overlay comparison of the states of Column Torque, $T_{col}$ shown in FIGS. 4A and 4B.
Figure 5:
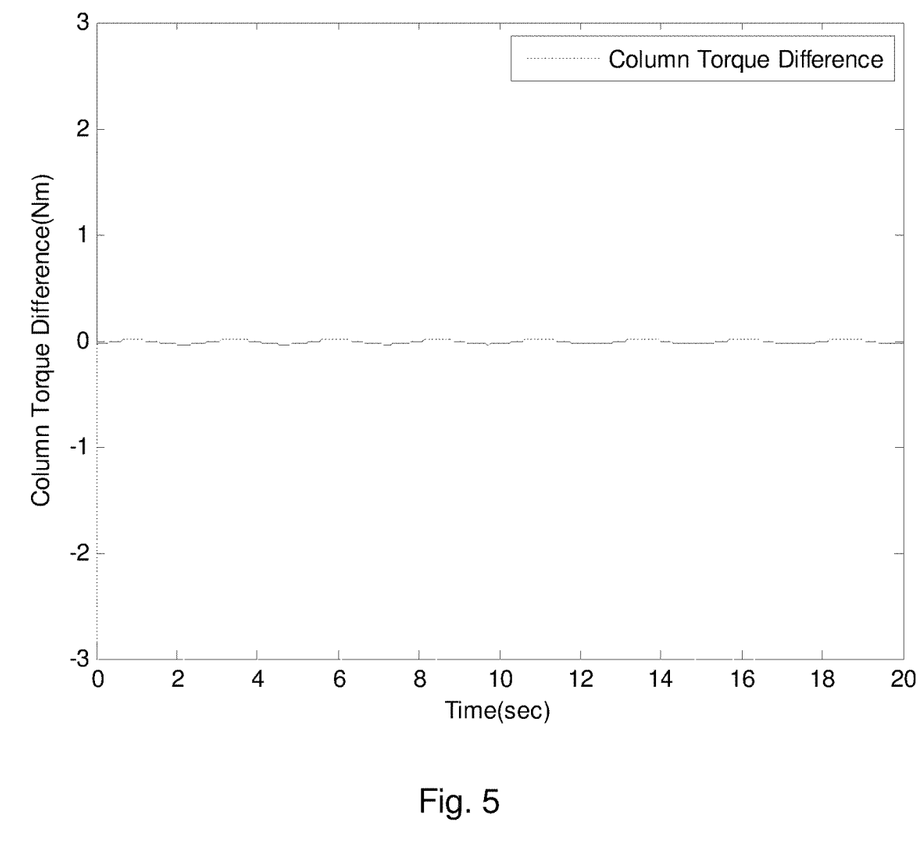
FIG. 5 is a time dependent plot of the difference between compensated column torque and original column torque in accordance with the invention.

FIGS. 4A-4C illustrate a column torque comparison under three different configurations, namely: (1) uncompensated column torque without disturbance; (2) compensated column torque with disturbance; and (3) uncompensated column torque with disturbance. It can be clearly seen that the disturbance is successfully isolated from the rest of the system when active disturbance rejection is enabled such that it has minimal impact on column torque. However, the original system without active disturbance rejection shows significant differences in the time-domain response. The difference of column torque between compensated column torque and original column is also shown in FIG. 5 to illustrate the same concept.

EXAMPLE 2

Figure 6A:
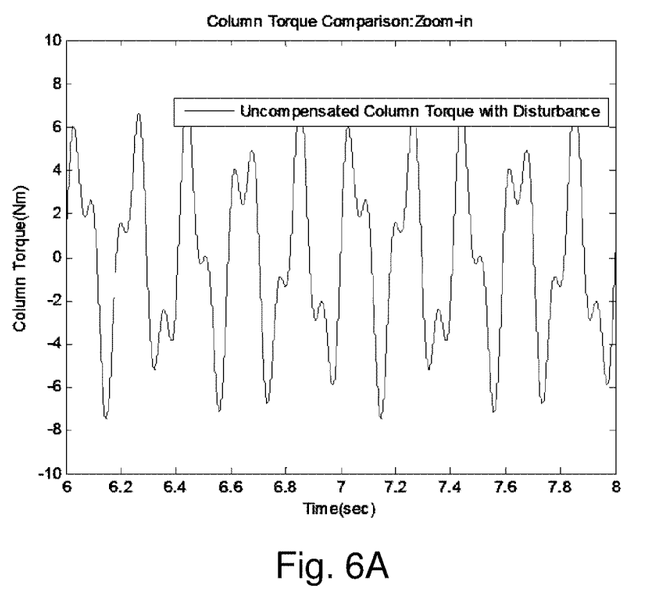
FIG. 6A is a graph of Column Torque, $T_{col}$, similar to FIG. 4A, having a different disturbance forcing function.
Figure 6B:
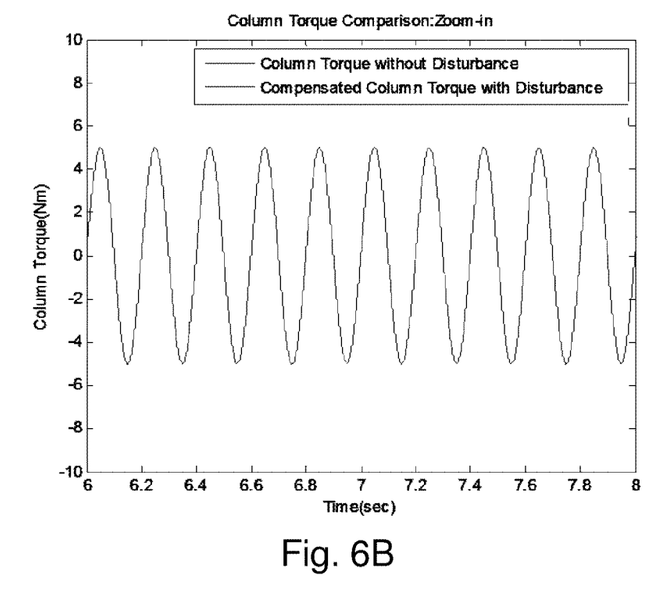
FIG. 6B is a graph of Column Torque, $T_{col}$ of FIG. 6A after correction by active disturbance rejection.
Figure 6C:
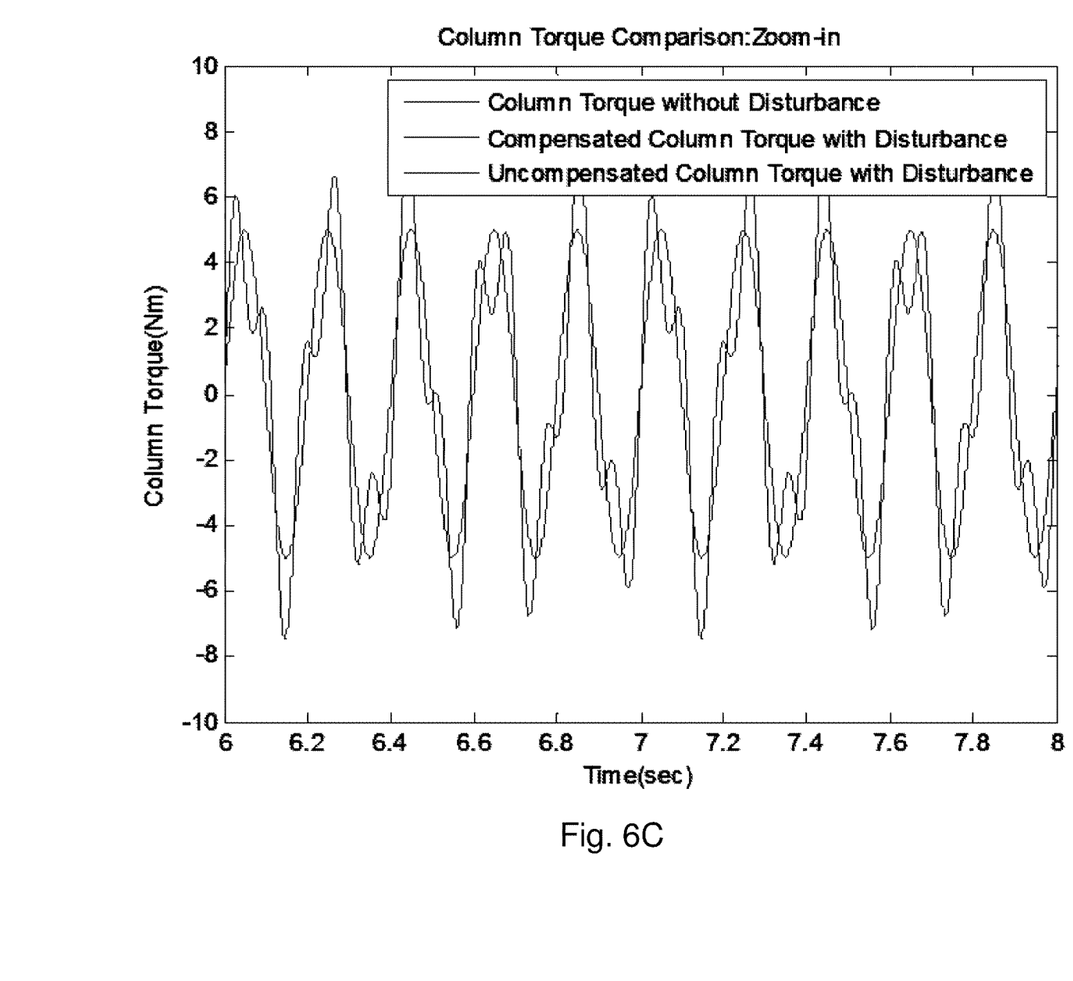
FIG. 6C is an overlay comparison of the states of Column Torque, $T_{col}$ shown in FIGS. 6A and 6B.

In another embodiment of the invention, the EPS system and method may be used where disturbance frequency is different from that of $T_{assist}$. In a first step, it is assumed that the frequency of $T_{assist}$ is about 5 Hz and the disturbance frequency is about 12 Hz. Referring now to FIGS. 6A-6C, it can be clearly shown that column torque with active disturbance rejection only contains one frequency component and is isolated from the disturbance.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A method of isolating a disturbance input ($T_{disturbance}(s)$) in an electric power steering system, the system including a steering wheel for receiving a driver-applied torque for steering a vehicle, an electric motor coupled to supply a motor assist torque ($T_{assist}(s)$) to the system to reduce driver steering input effort, and a vehicle component generating the disturbance input to the electric power steering system, the method including the steps of:
   (a) measuring a steering column torque, ($T_{col}(s)$), and
   (b) isolating the disturbance input from the steering wheel by following the relationships:

$$\frac{T_{col}(s)}{T_{assist}(s)} \approx p(s)$$

such that the steering system dynamics from $T_{assist}$ to $T_{col}$ is controlled to maintain the original steering feel, where p(s) is the nominal system model from $T_{assist}$ to $T_{col}$ within a predetermined frequency range; and $$\frac{T_{col}(s)}{T_{disturbance}(s)} \approx 0$$

such that $T_{disturbance}$ does not have an impact on $T_{col}$, which isolates the disturbance from the driver, thus rejecting the disturbance.

2. The method of claim 1 wherein the relationships are achieved by utilizing a combined feedback and feed-forward compensator.

3. The method of claim 2 wherein the feedback compensator is defined by the equation $C_{feedback}(s)=H(s)P_n^{-1}(s)$ and the feed-forward compensator is defined by the equation $$C_{feedforward}(s) = \frac{1}{1 - H(s)},$$

where H(s) is a filter and $P_n(s)$ is a model approximation.

4. The method of claim 3 wherein a choice of the filter H(s) is based upon characteristics of at least one of a disturbance frequency and a noise requirement, and wherein the filter may be one or more of a Low-pass filter, a High-pass filter, a Band-pass filter, a Selective filter, and a combination of one or more of these filter by either repeating the filter structure or designing multiple filters H(s) to span the specific disturbance frequency ranges.

5. The method of claim 4 wherein a design of the filter H(s) can be performed by one of an off-line and an on-line process by adjusting parameters of the filter to meet criteria for achieving a desired system performance.

6. The method of claim 5 wherein parameters of filter H(s) can be further designed by using one or more of a vehicle speed, a wheel speed, a column velocity and a column angle.

7. The method of claim 3 wherein a design of the model approximation $P_n(s)$ can be performed by one of an off-line and an on-line process by adjusting parameters of the filter to meet criteria for achieving a desired system performance.

8. The method of claim 7 wherein parameters of $P_n(s)$ can be further can be further designed by using one or more of a vehicle speed, a wheel speed, a column velocity and a column angle.

9. The method of claim 3 wherein filter H(s) is configured as a band pass filter such that a noise frequency is removed.

10. The method of claim 1 wherein step (b) can be selectively enable and disabled by the use of at least one of a hysteresis and a ramping function based on at least one of vehicle speed, a torque sensor value and a dialogistic algorithm to verify its effectiveness in order to avoid erroneous compensation.

11. The method of claim 9 wherein when step (b) is disabled, a control strategy is applied, the control strategy being one of (1) a switch to second disturbance compensation strategy that might still work under current vehicle conditions, (2) a hold the last control action before active disturbance rejection is totally disabled, and (3) a total disabling of the active disturbance rejection torque.

* * * * *